June 29, 1943.　　　G. P. DAIGER　　　2,322,924
METHOD OF MAKING MOTORS
Filed Feb. 5, 1940　　　2 Sheets-Sheet 1

INVENTOR
George P. Daiger
BY
Harry S. Dumass
ATTORNEY

June 29, 1943.    G. P. DAIGER    2,322,924
METHOD OF MAKING MOTORS
Filed Feb. 5, 1940    2 Sheets-Sheet 2

INVENTOR
George P. Daiger
BY
Harry S. Bumarer
ATTORNEY

Patented June 29, 1943

2,322,924

UNITED STATES PATENT OFFICE 2,322,924

METHOD OF MAKING MOTORS

George P. Daiger, Canton, Ohio, assignor to The Hoover Company, North Canton, Ohio Application February 5, 1940, Serial No. 317,381

10 Claims. (Cl. 29—155.5)

This invention relates to a motor fan assembly for use in an absorption refrigeration apparatus of the type using an inert pressure equalizing medium, and more particularly, to the method of constructing such a motor fan assembly.

There are many problems peculiar to the adaptation and use of an electric motor in a three fluid absorption refrigeration apparatus which impose serious constructional and economic problems on one desiring to devise a mode of constructing such an assembly which is simple in nature, capable of being performed by ordinary skilled labor, adaptable to mass production, economical, and which results in a minimum number of defective assemblies. The novel method of construction with which this invention concerns itself fulfills each of the foregoing requirements to an unusually high degree as will become apparent from the present disclosure.

In the present motor application, it was deemed necessary to locate the field outside of the refrigeration system and the rotor on the inside. Since refrigeration systems of the absorption type must be constructed to withstand internal pressures as high as 800 lbs. per square inch to provide a working factor of safety, the strength of the system wall should be great at all points including the portion between the motor rotor and field. Therefore, the present invention provides a novel solution to a number of apparently irresolvable conflicting factors. For example, efficient motor design requires that the space between the rotor and the field structure be a minimum, and at the same time the application of the motor to an absorption refrigerating apparatus requires that the portion of the wall between the rotor and stator be of maximum strength.

Still another example of a problem solved by his invention is the following: The only material suitable for the construction of absorption refrigeration systems in large quantities is steel. This material, is of course, highly magnetic, which is an advantageous property for the material separating the field structure from the rotor, but disadvantageous for the portion of the system walls on either side of the field structure. Thus, in using steel for such purposes, its desirable magnetic properties for that portion between the motor field and rotor are opposed by its undesirable magnetic properties for the portion at either end of the field structure which permits large magnetic flux leakage and consequently a great decrease in the efficiency of the motor.

It is an object of this invention to provide a novel method of constructing a motor fan assembly for circulating an inert gas in an absorption refrigeration apparatus of the general type illustrated, for example, in a United States application for Letters Patent of Curtis C. Coons and Rudolph S. Nelson, Serial No. 118,284, filed December 30, 1936.

More particularly, it is an object of this invention to provide an improved method of fabricating a hermetically sealed motor fan assembly in which a shell of novel construction is interposed between the rotor and field of the motor, and in which the shell is so constructed and arranged as to form an integral part of the refrigeration system itself. More specifically, this shell comprises a thin section of magnetic material between the stator and rotor, and sections of non-magnetic material on either side thereof.

A further object of the invention is to employ materials for the construction of the shell which are highly resistant to the corrosive action of the working mediums within the refrigeration system, which have the necessary strength characteristics to withstand the high, internal pressures of the system, and which also can be easily and securely joined together in a simple manner as by welding.

Still another object of this invention is to provide a method of construction for a motor fan assembly in which the internal parts are separated from the external parts by a composite shell capable of being assembled and then machined from within and without to a high degree of accuracy. More particularly, it is an object to provide a shell of the character just described in which the internal parts can be inserted permanently with a minimum of difficulty, and in which the external parts can be assembled and disassembled with a minimum of difficulty and without otherwise disturbing the refrigerator system.

Still other objects and advantages of the invention will become apparent as the description proceeds when taken in connection with the accompanying drawings, in which.

Figure 1:
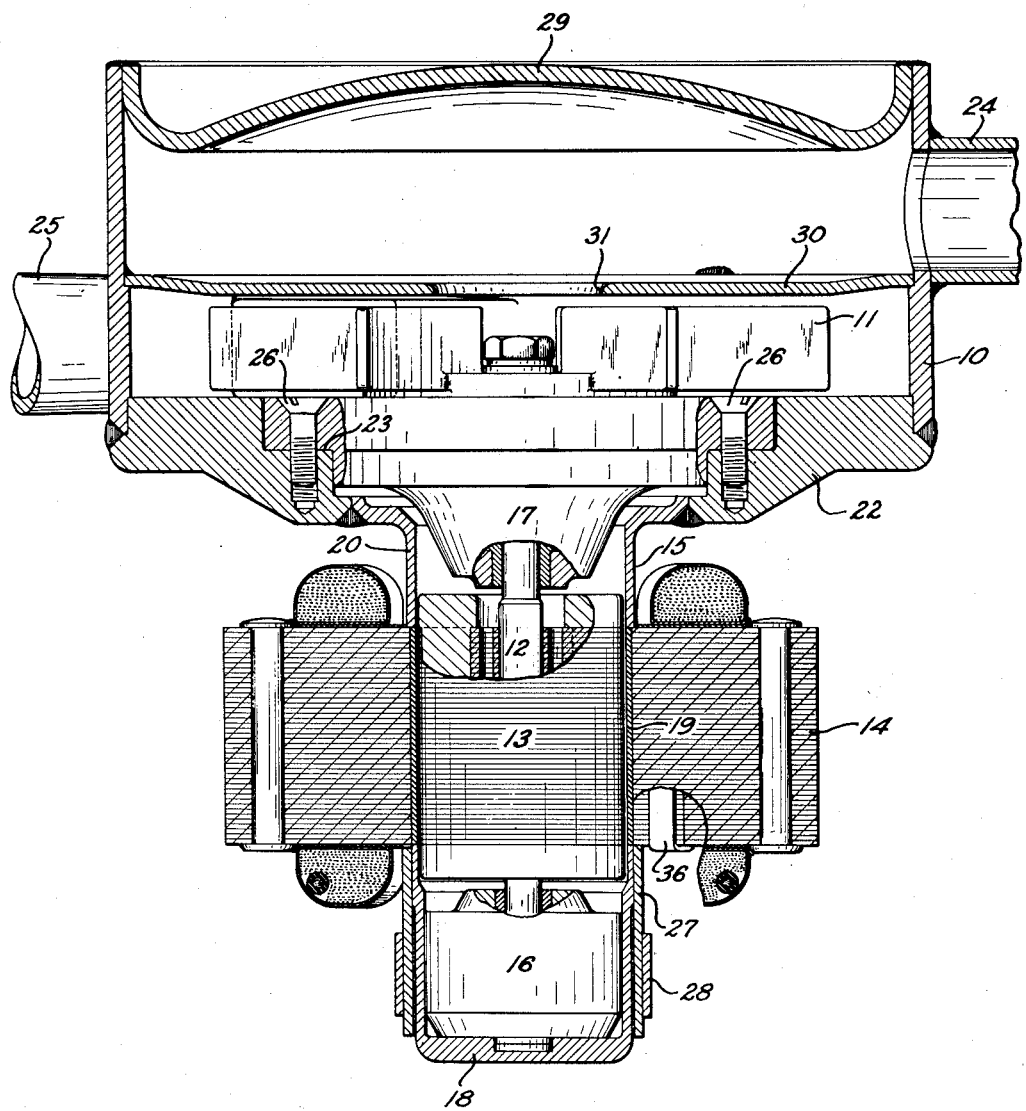
Figure 1 is a cross sectional view of a motor fan unit made in accordance with the procedure of the present invention.

Referring to Figure 1, the motor fan unit comprises a fan housing 10, housing an impeller fan 11 connected by a shaft 12 to a motor rotor 13.

The motor rotor is separated from the field structure 14 by a thin shell 15. The fan and rotor are positioned within the shell and fan casing by a lower bearing assembly 16 and an upper bearing assembly 17 which are not shown in detail. The rotor 13 may be made of stainless steel laminations with cast aluminum conductor bars and end rings forming a well known squirrel cage rotor.

The shell 15 is made up of three sections, a cup-shaped end member 18, a straight annular section 19 and a flanged annular section 20. The sections 18 and 20 are made of high strength stainless steel having non-magnetic properties. This steel is what is known as 18–8 stainless steel and is a high strength steel alloy containing 17 to 19% chromium and 7 to 9½% nickel with a small percentage of carbon. This steel is well known in the art and is non-magnetic in that it has a high reluctance and low permeability. The section 19 is made of a high strength magnetic stainless steel. One well known high strength magnetic stainless steel is a chromium iron alloy containing 16 to 18% chromium with a low percentage of carbon.

In absorption refrigerating apparatus of the type referred to, the internal pressure sometimes goes beyond 300 pounds per square inch. The internal pressure being substantially equalized, only a small power unit is needed to circulate the mediums in the apparatus; therefore the power input for the motor may be as low as 12 to 15 watts. It can therefore be seen that the shell 19 between the stator and rotor must have the best magnetic properties possible combined with great strength and maximum corrosion resisting properties. The making of the portion of the shell 19 between the rotor and stator of magnetic stainless steel reduces the effective air gap between the rotor and stator and the making of the end sections 18 and 20 of non-magnetic stainless steel prevents magnetic flux leakage from the field to other parts of the system. All three sections have high strength and good corrosion resisting properties.

The sections 18 and 20 of the shell may be made of hot rolled steel and may be machined from bar stock but are preferably stamped by a stamping operation from sheet stock and the section 19 may be made of seamless hot rolled, annealed steel tubing. The section 19 is made of hot rolled annealed stock because of the fact that cold working affects the magnetic properties of the steel. The end sections 18 and 20 can be stamped from sheet stock since they are already of non-magnetic material and cold working does not affect them sufficiently to materially change the magnetic characteristics of the metal.

Figure 2:
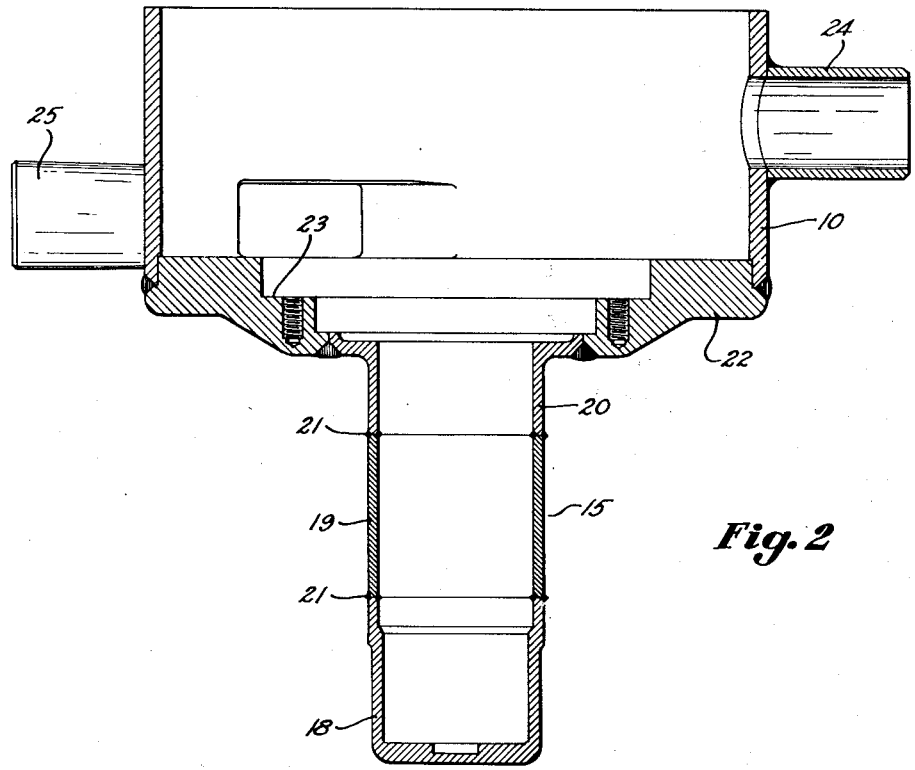
Figure 2 is a view of the motor fan housing at an intermediate stage in its manufacture.

As shown in Figure 2, the section 18 is cup-shaped and flared at the upper end so that the lower closed end has a reduced external diameter and the flared end is of the same diameter as the sections 19 and 20 and of substantially the same thickness prior to machining.

The section 18 is first welded to the lower end of the section 19 and then the section 20 is welded to the upper end of the section 19. This procedure may be reversed since it is immaterial which weld is made first.

This welding may be done by any process but is preferably performed by the flash or resistance method. This method is old and well known in the art and consists briefly in bringing the abutting ends into contact and at the same time passing a welding current through them. During this period, the metals are rapidly heated and a considerable portion of each is burned away. At the instant the correct welding temperature is reached, the welding current is automatically shut off and the parts brought together so as to produce a bulge as shown at 21 of Figure 2. By this process the oxidized metal is forced into the bulge and may be machined off. At the same time, the heating is so fast that the metals adjacent the weld are not heated up sufficiently to affect their magnetic properties.

By making the shell of high strength steel alloys and welding the sections together, a leak proof casing can be made with precision which will withstand the high pressures involved.

After the sections 18, 19 and 20 are welded together they are rough machined so as to remove the bulges 21 caused by the welding operation and are hydraulically tested for leaks. The removing of the bulges 21 by the rough machining operation facilitates the testing of the shell since leaks are thereby more easily detected. The flange of the section 20 is then welded to the bottom 22 of the fan housing 10 by any suitable method. This forms a unitary structure consisting of a cup-shaped member 18 of non-magnetic stainless steel, an annular section 19 of annealed magnetic stainless steel, a second annular section of non-magnetic stainless steel and the bottom plate 22 for the fan housing.

The over-all dimensions of these motor-rotors is less than 1½ inches, the clearance between the rotor and stator is only a few thousandths of an inch, and the tolerances allowed in machining are of the order of a fraction of a thousandth of an inch. It is therefore necessary that the various parts be assembled and machined very carefully so that the parts will be lined up properly when completed.

The unitary structure comprising the rough machined shell 15 and the bottom 22 of the fan housing is placed in any suitable turning machine and the reduced diameter of the cup-shaped section 18 is machined to a given internal diameter. The sections 19 and 20 are then machined on the interior to a slightly larger diameter than that of the reduced section 18. The portion 22 of the fan housing is also machined to form a seat 23 for the upper bearing assembly 17 of the motor-fan rotor. The exterior of the magnetic annular section 19 is also machined to provide for the assembly of the field structure 14.

All of these machining operations are performed while the shell 15 and bottom plate 22 are being rotated about the axis of the shell.

Since the power input to these motors is so small it is essential that the section 19 be made as thin as possible so that excess losses will not be caused by eddy currents. In practice the section 19 is made about twenty thousandths of an inch thick. When the field structure is assembled it will support the shell against internal pressure. The shell being of magnetic material will in reality form a part of the magnetic circuit of the motor and being very thin will not cause excessive losses.

By turning the interior and exterior of the shell about the same axis, the shell will be the same thickness all around and therefore will not cause an objectionable magnetic hum due to unequal flux distribution when the motor is in operation.

Performing the machining operations after all the welds are made results in a precision made casing in which all of the parts will be accurately aligned when the motor is assembled.

Machining the interior of the sections 19 and 20 larger than that of section 18 facilitates the assembly of the lower bearing assembly 16 and the axial assembly of the fan and rotor.

The remainder of the fan housing 10 may then be secured to the bottom plate 22 by any suitable means such as welding, or it may, if desired, be welded to the bottom plate 22 before the machining operation, in which case the annular portion of the casing may be machined on the interior to form a seat for the plate 30. Inlet and outlet conduits 24 and 25 are also welded to the fan housing 10 so as to provide means for ultimately welding to the conduits of a refrigerating system such as shown in the aforementioned application.

In assembling the rotor and stator, the lower bearing assembly 16 is inserted through the enlarged bore of the sections 19 and 20 into the reduced bore of the section 18 and press fitted therein. The motor-fan rotor assembly including the upper bearing assembly 17 is then inserted axially into the shell and fan casing with the lower end of the shaft positioned in the lower bearing assembly 16 and the upper bearing assembly 17 positioned on the seat 23. The upper bearing assembly 17 may then be secured to the bottom plate 22 by any suitable means such as by screws 26. The field structure 14 may then be slid over the reduced end portion 18 onto the machined portion of the section 19 and press fitted thereon. To assure that the field structure 14 will not become removed from the magnetic annulus 19 and to position it at the proper position thereon, a supporting ring 27 is provided which is held in position by a clamping ring 28. The fan casing 10 may then be closed by any suitable means such as by welding a cover 29 thereto. The fan chamber 10 is separated into a suction chamber and compression chamber by a plate 30 having an opening 31 leading to the suction side of the fan. This plate is welded to the interior of the casing 10 prior to welding the cover 29 to the casing.

After the field 14 is positioned over the section 19 to support it against internal pressure and the cover 29 welded to the fan case the whole assembly is tested for leaks under hydraulic pressure of eight hundred pounds per square inch.

The rotor 13 of this type of motor is between 1¼ and 1⅓" in diameter and the power input to the field structure 14 is in the neighborhood of some 12 to 15 watts. It can therefore be seen that it is essential that the section 19 of the shell between the rotor and stator be as thin as possible consistent with withstanding the high pressures within the system. It can also be seen that since this motor is of such a small size that the machining tolerances will be in the order of fractions of thousandths of inches.

The magnetic annular portion 19 in effect forms part of the field structure 14, this being of magnetic steel of low reluctance, the magnetic lines of force will pass through it easily. In addition, the section 19 forms a part of the mechanical structure of the housing as does the field structure 14 itself since the field structure supports the magnetic annular section 19 against internal pressure.

Figure 3:
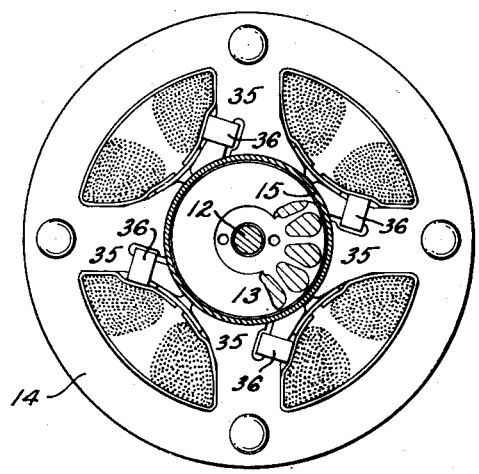
Figure 3 is a cross sectional view through the motor rotor and stator.

As shown in Figure 3, the field structure 14 is of the closed yoke salient pole type having poles 35 with shading coils 36. In fractional horse power motors of this type, it has been found that the motor has better running characteristics if the gaps between adjacent pole tips are closed by a magnetic bridge so that the poles totally embrace the rotor. In addition, to performing the functions previously enumerated, the magnetic section 19 also forms a magnetic bridge between the tips of adjacent poles 35 and thereby gives the motor better running characteristics.

The non-magnetic sections 18 and 20 also perform a double function, that is, an electrical function and a mechanical function. They form a part of the housing and being non-magnetic, they prevent magnetic flux leakage from the field structure 14 to the other parts of the machine casing.

Since the section 19 is of magnetic material and the sections 18 and 20 are of non-magnetic material, they of necessity must be made of separate pieces and it is essential that they be secured together in some manner which will withstand the high pressures within the interior of the casing and at the same time be capable of being positioned and machined with precision so that when assembled the various parts of the motor fan unit will be in proper alignment. The section 20 must also be made of a piece separate from the fan casing 10 and be welded to the bottom plate 22 since it is of non-magnetic material and the fan housing is of magnetic material. Therefore, the present method provides a simple way in which all of the parts of dissimilar metal may be secured together and at the same time be machined with accuracy so that the various parts can be assembled in the proper relationship and still have very small tolerances.

As can be seen, the particular sequences of the steps in the fabrication of the motor is of importance. The sections 18, 19 and 20 must be welded together before they are machined since if they were machined first, there would be a possibility that they would not be positioned in axial alignment and that therefore, when assembled, the rotor would be off center relative to the magnetic annular section 19 which would greatly reduce the efficiency of the motor and also cause objectionable magnetic hum. The material built up in forming the welds should be removed before testing for leaks since these tests can be more readily performed and leaks more readily located after this is done. The shell should be tested before being welded to the fan casing 10 because in the case of a leak unnecessary work would be required if the shell were welded to the fan casing beforehand. The shell should also be welded to the fan casing before either the shell or the interior of the fan casing is machined because otherwise the seat 23 for the upper bearing might not be aligned with the lower bearing and the remainder of the shell and thereby cause misalignment.

The machining of the lower section 18 of a smaller internal diameter than the upper sections 19 and 20 is also important since this permits the lower bearing assembly 16 being assembled through the bore of the upper sections 19 and 20 and to be press fitted into the lower reduced diameter of the lower section 18. The making of the lower section 18 of smaller external diameter than that of the machined section 19 is also important because it facilitates the assembly of the field structure over the reduced end section 18 so that it can be press fitted onto the machined section 19.

As can be seen from the foregoing, this invention provides simple and efficient methods of fabricating a small fractional horse power motor having a very thin shell between the rotor and stator combined with a fan unit in which the motor rotor and fan unit is hermetically sealed inside a casing and in which very small tolerances can be maintained in the manufacture thereof together with the most efficient magnetic properties of the shell.

It is to be understood that the protection herein applied for is not confined to the particular combinations of features or elements set out in the following claims. Protection is herein applied for for any one or more of the features or elements referred to in the following claims, or described in the foregoing specifications or shown in the accompanying drawings, either independently or in combination.

While only a single embodiment of the invention has been shown and described, it is to be understood that this embodiment is to be taken as illustrative only and not in a limiting sense. I do not wish to be limited to the specific embodiment described but to include all equivalent variations thereof except as limited by the scope of the claims.

I claim:

1. That method of making and assembling a hermetically sealed motor-fan gas circulator unit for circulating an inert medium in the gas circuit of an absorption refrigerating apparatus which comprises, pre-forming a non-magnetic closed end member and a non-magnetic annular member, welding a seamless tube of magnetic steel between the open end of the closed end member and one end of the annular member to form a unitary shell having an open end section and a closed end section with an annular section therebetween, welding the open end section of the shell to an open end fan casing to form a casing for a motor rotor and fan assembly, machining the interior of the closed end section to a predetermined diameter, machining the interior of the annular section and the open end section to a slightly larger diameter, machining the exterior of the annular section to a predetermined diameter whereby the annular section is thin relative to the end sections, assembling a pre-formed rotor bearing structure through the large interior diameter of the annular section and open end section into the small interior diameter of the closed end section, inserting a motor rotor and fan assembly axially into the casing with the rotor positioned at the annular section and pressing a stator assembly over the machined outer surface of the annular section of the casing.

2. That process of making a shell for separating the rotor and stator of a hermetically sealed motor which comprises, pre-forming a non-magnetic stainless steel cup-shaped member having a given thickness throughout and an open end of larger diameter than the closed end, welding the enlarged open end of said cup-shaped member to a section of seamless magnetic stainless steel tubing of the same thickness and diameter as the open end of said cup-shaped member, welding a pre-formed open ended annular member of non-magnetic stainless steel of the same thickness and diameter as the seamless magnetic steel tubing to the opposite end of the magnetic steel tubing to form a unitary shell having end sections of non-magnetic steel and an annular section of magnetic steel therebetween, machining the interior of the cup-shaped member to a predetermined diameter, machining the interior of the annular magnetic section and the open end section to a diameter slightly larger than that of the cup-shaped member and machining the exterior of the magnetic annular section to a diameter greater than that of said cup-shaped member whereby the magnetic annular section is thinner than the non-magnetic end sections and the interior and exterior diameter of the cup-shaped member is smaller than that of the other sections whereby the assembly of the rotor and stator may be facilitated.

3. That process of making and assembling a hermetically sealed motor of the type in which the rotor and stator are separated by a thin shell which comprises, pre-forming a closed end member of non-magnetic stainless steel having a flared open end of a given thickness and diameter, welding the open end of said closed end member to a section of seamless magnetic stainless steel tubing of the same thickness and diameter as the flared open end of the closed end member, welding an annular open ended section of non-magnetic stainless steel of the same diameter and thickness to the other end of the section of stainless tubing to form a unitary shell having an open ended end section of non-magnetic stainless steel, an annular intermediate section of magnetic stainless steel and a closed end section of non-magnetic stainless steel having a smaller diameter than the other sections, machining the interior of the closed end section to a predetermined diameter, machining the interior of the annular intermediate section and the open end section to a diameter larger than that of the closed end section, machining the exterior of the intermediate annular section whereby the intermediate annular section is thin relative to the other sections, pressing a pre-formed rotor bearing into the small diameter of the closed end section, assembling a rotor axially into the shell with the rotor proper positioned at the magnetic annular section and pressing a pre-formed stator structure over the exterior of the magnetic annular section, whereby the magnetic annular section forms a part of the magnetic path of the stator and is supported against internal pressure by the stator.

4. The method of forming a shell for separating the rotor and stator of a hermetically sealed motor comprising, forming a cup-shaped member having a flared end of a given diameter and thickness, welding the flared end to an annular section of the same diameter and thickness, welding the free end of the annular section to a second annular section of the same diameter and thickness to form a unitary shell, machining the interior of the cup-shaped member to a predetermined diameter, machining the remainder of the interior of the shell to a diameter greater than that of the cup-shaped member and machining the exterior of the first annular section, whereby the first annular section is of reduced thickness relative to the other sections.

5. The method of making and assembling a hermetically sealed motor unit which comprises, forming a closed end member having a flared end of a given diameter and thickness, welding the flared end to an annular section of the same diameter and thickness, welding the free end of the annular section to a second annular section of the same diameter and thickness to form a unitary shell, machining the interior of the closed end member to a pre-determined diameter, machining the interior of the annular sections to a diameter greater than that of the closed end member, machining the exterior of the first annular section whereby the first annular section is of reduced thickness relative to the other sections, pressing a pre-formed rotor bearing into the reduced diameter of the closed end member, assembling a rotor axially into the shell with the rotor shaft seated in the bearing and the rotor proper positioned beneath the first annular section, and pressing a pre-formed stator structure over the exterior of the first annular section whereby the thin annular section will be supported against internal pressure by the stator structure.

6. The method of making a hermetically sealed motor fan unit of the type having a thin shell separating the motor rotor from the stator comprising, welding three annular sections of dis-similar metals into a unitary structure in end to end relationship to form a rough shell for enclosing the motor rotor, welding the end of the unitary shell to a fan casing so that the interior of the shell communicates with the interior of the fan casing, and machining the interior of each of the sections forming the shell, the interior of the fan casing and the exterior of the intermediate annular section while the shell and casing is being rotated about the axis of the shell.

7. The method of making and assembling a hermetically sealed motor fan unit of the type in which a thin shell separates the motor rotor and the stator and in which the shell communicates with and is welded to the fan casing at one end and is closed at the other end comprising, machining the interior of the shell adjacent the closed end to a given diameter, machining the remainder of the shell interior to a diameter larger than that at the closed end, machining the interior of the fan casing to form a seat for rotor positioning means, machining the exterior of the shell adjacent its closed end, all of said foregoing machining operations being performed while the shell and fan casing is being rotated about the axis of the shell, placing a rotor bearing into the reduced diameter adjacent the closed end of the shell, axially inserting a motor-fan rotor assembly and rotor positioning means into the shell and casing with the rotor shaft positioned in the bearing and the rotor positioning means positioned on the seat of the fan casing and finally pressing a preformed electro-magnetic stator structure on the exterior machined portion of the shell.

8. The method of making a housing for a hermetically sealed motor fan unit of the type in which a thin shell separates the motor rotor and stator comprising, welding together three annular sections of dis-similar metals in end to end relationship to form a unitary blank for the shell, rough machining the shell blank to remove metal built up by the welding operation, testing the shell blank for leaks at the welds, welding the rough machined shell blank to a preformed fan casing with the interior of the shell communicating with the interior of the fan casing and finish machining the interior of the shell, the interior of the fan casing, and portions of the exterior of the shell to form a unitary casing for the motor rotor and the fan, and a machined support for the stator.

9. The method of making a housing for a hermetically sealed motor fan unit of the type in which a thin shell separates the motor rotor and the stator comprising, welding together three annular sections of dissimilar metals in end-to-end relationship by the resistance method while forcing the sections together to form an oxide containing bulge at their juncture as the metal reaches a welding temperature to form a unitary blank for the shell, rough machining the shell blank to remove metal built up by the welding operation, welding the rough machined shell blank to a preformed fan casing with the interior of the shell communicating with the interior of the fan casing and finish machining the interior of the shell, the interior of the fan casing and portions of the exterior of the shell to form a unitary casing for the motor rotor and the fan and a machined support for the stator.

10. The method of making a hermetically sealed motor fan unit of the type having a thin shell separating the motor rotor from the stator comprising, welding two annular sections of non-magnetic steel to the ends of an annular section of magnetic steel in end-to-end relationship by the resistance method while forcing the sections together to form an oxide containing bulge at their juncture as the metal reaches a welding temperature to form a rough shell for enclosing the motor rotor, welding the end of the unitary shell to a fan casing so that the interior of the shell communicates with the interior of the fan casing, and machining the interior of each of the sections forming the shell, the interior of the fan casing and the exterior of the intermediate annular section.

GEORGE P. DAIGER.